March 4, 1924.

S. S. DAYKIN 1,485,555

WELDED JOINT FOR BARRELS

Filed Feb. 10, 1921

Inventor
S. S. Daykin
By
Hull Brock & West
Attys.

Patented Mar. 4, 1924.

1,485,555

UNITED STATES PATENT OFFICE.

SPENSLEY S. DAYKIN, OF CLEVELAND, OHIO, ASSIGNOR TO THE HYDRAULIC STEEL COMPANY, OF CLEVELAND, OHIO, A CORPORATION OF OHIO.

WELDED JOINT FOR BARRELS.

Application filed February 10, 1921. Serial No. 443,834.

*To all whom it may concern:*

Be it known that I, SPENSLEY S. DAYKIN, a citizen of the United States, residing at Cleveland, in the county of Cuyahoga and State of Ohio, have invented a certain new and useful Improvement in Welded Joints for Barrels, of which the following is a full, clear, and exact description, reference being had to the accompanying drawings.

This invention relates generally to sheet metal barrels and more particularly to the joint for connecting the two sections thereof and the method of uniting said parts.

The object of the invention is to provide a simple and efficient method of uniting two substantially similar sections and providing a tight central joint; and a further object is to provide for the quick and easy assemblage and union of the said sections in a central joint. With these objects in view the construction consists in the novel features of construction hereinafter fully described and pointed out in the claims.

Figure 1:
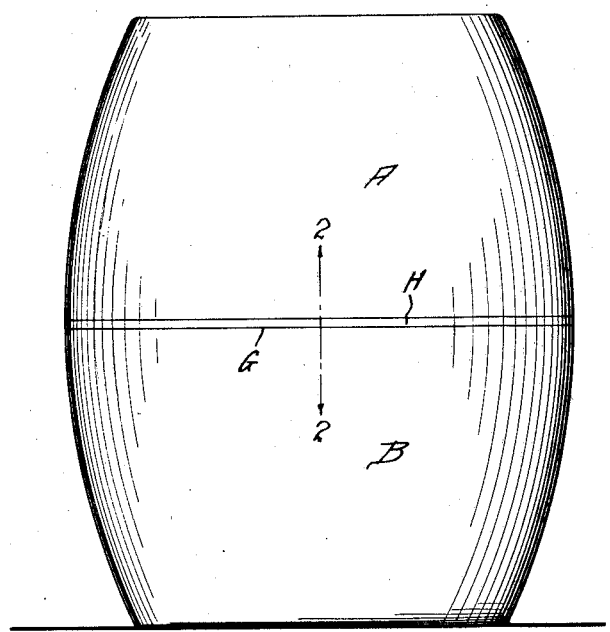
Figure 2:
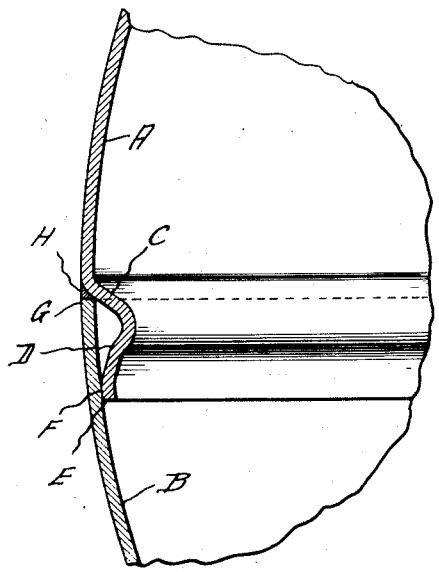

In the drawings forming a part of this specification, Fig. 1 is a side elevation of a barrel constructed in accordance with my invention; Fig. 2 is an enlarged detail sectional view of the joint.

In carrying out my invention I employ two substantially similar tub-like sections A and B, the edge of the section B however, being brought inwardly as shown at C and then turned outwardly as indicated at D, providing an edge E which is so contracted and inclined as to provide a line contact at the point F upon the interior of the section B.

In assembling the sections the contracted and inclined edge E is forced into the section B and continued downwardly until the edge G of the section D approaches the inwardly bent portion C of the section A and then by means of an arc weld H I securely unite the sections A and B and provide a material reinforcement at the center by virtue of the inturned and outturned portions C and D and the line contact F.

It will, of course, be understood that if desired the groove produced by the inward and outward bends C and D may be filled with brazing material and a good weld such as can be obtained by arc welding will provide a perfectly secure connection between the tub sections. By accurately forming the tub sections, the contracted and inclined edge of the section A will serve as a guide to properly position the parts and bring them into their proper relative positions ready to receive the arc weld.

It will be noted that by constructing the edges of the section in the manner herein shown and described and uniting them by the weld at the points designated, a substantially uniform curve or bilge will be imparted to the barrel.

It will thus be seen that I provide a simple and efficient method for connecting the end sections together and also provide a simple and secure central joint for uniting said sections.

Having thus described my invention what I claim is:

1. A barrel comprising two tub-like sections, the edge of one section being formed with an inwardly extending annular shoulder and the extreme edge projected outwardly, the inwardly and outwardly bent portions being inserted into the edge of the other tub-like section, said edge contacting with the inwardly extending annular shoulder of the first named section, said parts being welded together at their points of contact.

2. The hereindescribed method of making sheet metal barrels which consists in providing two tub-like sections, the edge of one section being bent inwardly as shown at C and outwardly as at D, inserting said contracted end into the other section and bringing the inwardly and outwardly bent portions of the first tub-like section into contact with the second named tub-like section and then welding the edge of the receiving section to the side of the inserted section at the point where said side is turned inwardly.

In testimony whereof, I hereunto affix my signature.

SPENSLEY S. DAYKIN.